J. HAESSEL.
Shovel Plow.
No. 83,154.                                              Patented Oct. 20, 1868.
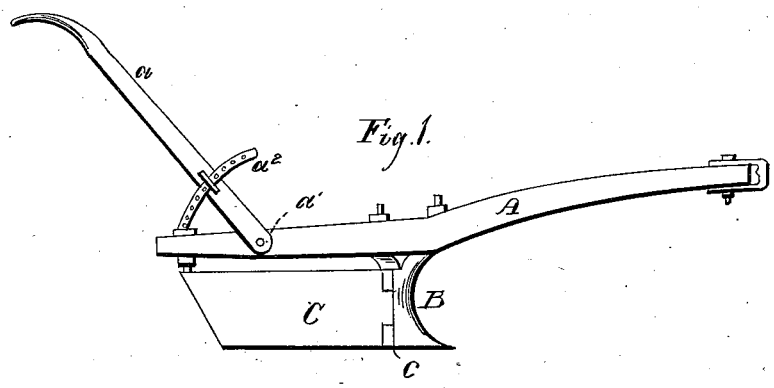
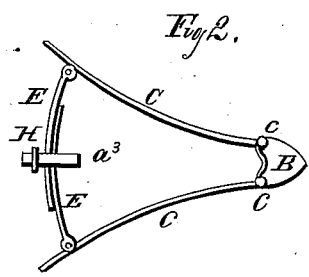
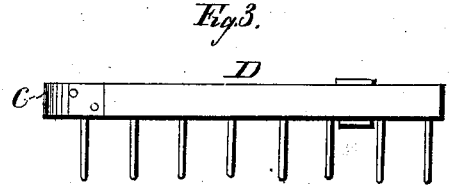
Witnesses:
Robert Burns
H. Pauly
Inventor:
J. Haessel by his attys
M. Randolph & Co

United States Patent Office.

JACOB HAESSEL, OF ST. LOUIS, MISSOURI.

*Letters Patent No. 83,154, dated October 20, 1868.*

IMPROVEMENT IN COMBINED PLOW AND HARROW.

The Schedule referred to in these Letters Patent and making part of the same.

*To all whom it may concern:*

Be it known that I, JACOB HAESSEL, of St. Louis, in the county of St. Louis, and State of Missouri, have made certain new and useful Improvements in Plows and Cultivators; and I do hereby declare that the following is a full and clear description thereof, reference being had to the accompanying drawings, and to the letters of reference marked thereon.

This invention relates to an improvement in horticultural implements, the same being a convertible plow, cultivator, and harrow.

The invention will be readily understood by reference to the accompanying drawings, of which—

Figure 1 is a side elevation of the improved implement.

Figure 2 is a sectional plan of the plow and scraper-plates, taken just below the beam.

Figure 3 is an elevation of one of the harrow-sides, removed from the beam.

The beam A is similar to that of an ordinary plow or cultivator, and it is provided with handles $a$, which are pivoted to the beam at $a^1$, and are guided by the iron arm $a^2$, to which they may be adjusted at any required height.

The beam A carries a shovel-plow, B, and to the back of this shovel-plow are to be hinged two adjustable removable scrapers C, or two similarly-adjustable removable harrows D. These scrapers or harrows, as the case may be, are hinged to the shovel at $c$, so as to allow their rear ends to be opened, more or less, outwardly.

The two straps E shown in fig. 2 are pivoted to the rear ends of the scrapers or the harrows, whichever may be in use at the time, and the inner ends of these straps overlap each other in the central post $a^3$, to which they may be secured by means of the set-screw H, so as to hold the rear ends of the scrapers or harrows, as the case may be, in whatever position may be desired.

For cultivating garden-vegetables, this machine is eminently adapted; but it may be used for farm-purposes, with good results.

The plow opens the furrow, while scrapers or harrows, following, break up the clods, and leave the surface smooth and even. The tendency of the scrapers is to throw the dirt toward the roots of the plants, which is very essential at certain stages of the cultivation.

Having described my invention,

What I claim is—

The arrangement of the harrows D with the plow A B, in the manner shown and described.

In testimony of which invention, I hereunto set my hand, in presence of—

JACOB HAESSEL.

Witnesses:
M. RANDOLPH,
ROBERT BURNS.